United States Patent Office 3,495,027
Patented Feb. 10, 1970

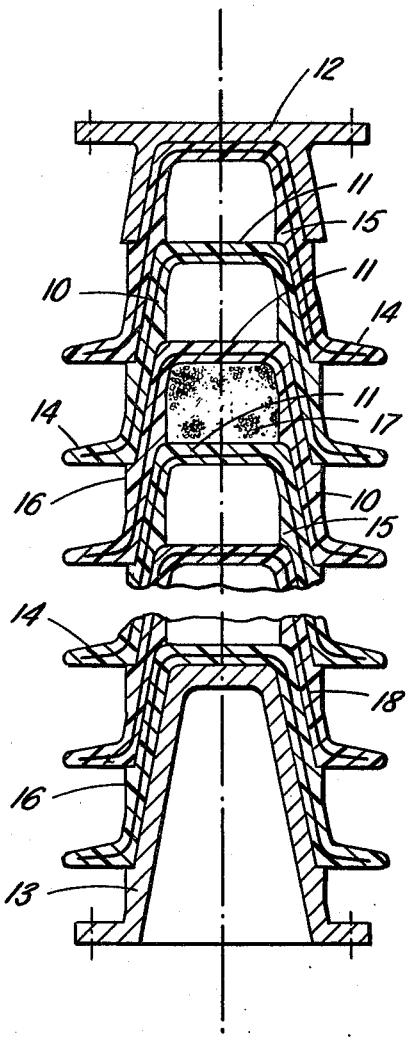

3,495,027
ELECTRICALLY INSULATING STRUCTURAL MEMBERS FORMED FROM CONICAL ELEMENTS FITTING ONE INTO ANOTHER
Peter John Lambeth, Bookham, and John Sidney Thomas Looms, East Molesey, England, assignors to Central Electricity Generating Board, London, England, a British body corporate
Continuation-in-part of application Ser. No. 620,855, Mar. 6, 1967. This application May 26, 1969, Ser. No. 827,508
Int. Cl. H01b 17/14, 17/42, 17/60
U.S. Cl. 174—140
8 Claims

ABSTRACT OF THE DISCLOSURE

An electrically insulating structural member is formed of a stack of truncated conical elements of insulating material having mating conical portions the elements being closed at their narrower ends. Each element extends at least halfway into the next but the axial spacing of the successive elements is at least three times the thickness of the closure portion at the narrower end to leave voids which may be filled with conductive material, such as a foamed plastic made conductive by a suitable additive, to improve the electric stress distribution. Alternatively metal electrodes may be embedded in the elements which are preferably made from resin-bonded glass fibre material. Each element is stepped on its inner and/or outer surface so as to form a shoulder against which the next element abuts, thereby eneabling the positions of the elements to be precisely controlled.

---

This application is a continuation-in-part of application Ser. No. 620,855, filed Mar. 6, 1967 and now abandoned.

BACKGROUND OF THE INVENTION

Field of the invention

This invention relates to structural members capable of carrying substantial loads and in particular capable of withstanding bending loads but which are also electrically insulating to withstand very high voltages.

Prior art

It has been suggested that tubular resin-bonded glass fibre elements could be employed as insulating structural members, for example in towers for supporting high voltage transmission lines. Such tubular elements have been proposed for example as cross-arms, struts or cantilevers on metal towers or, for lower voltages, on wood pole structures, the conductors being carried directly on the insulating structural elements or supported therefrom by suspension insulators which can be much smaller than those employed in conventional constructions where the suspension insulator itself determines the total length of the leakage path. More generally, however, electrically insulating structural members are required for a wide variety of purposes particularly where there is any risk of equipment coming in contact with high voltage conductors.

This invention makes use of a stack of elements fitting one into another. It has been proposed, for example, in United States Patent No. 1,093,479 of Sandford to form a post-type electrical insulator for supporting an electrical cable of a plurality of similar bell-shaped porcelain units nested one in another and cemented together. Such insulators only have to withstand limited direct compression loads; they have very little tensile strength or ability to withstand bending stresses. The use of porcelain and cement requires a large cement thickness, typically of the order of one centimetre because of the wide dimensional tolerances inherent in the use of fired porcelain. Moreover cement is a porous material so that the interior spaces of the insulator usually will not be free of moisture.

SUMMARY OF THE INVENTION

It is an object of the present invention to provide a structural member, particularly for use as a compression-loaded structural member or as a beam, which not only has a high structural strength but which is electrically insulating and capable of withstanding very high voltages.

According to this invention, an electrically insulating structural member is formed of a plurality of truncated conical elements of resin-bonded fibre insulating material, each element being closed at or near its narrower end, the elements being stacked together and arranged so that the axial spacing of the successive elements in the stack is at least three and preferably at least six times the thickness, in the axial direction of the stack, of the closure portion extending across each element at or near its narrower end and each element extending at least halfway into the interior of the next element in the stack. The various elements, in a compression-loaded structural member, are held together by the compression forces but they are secured together with an adhesive. Each element has on its inner or on its outer surface or on both surfaces a step forming a shoulder facing in the direction towards the next element in the stack, the shoulder on each element bearing against the end of the next element in the stack and being formed by a thickening of the wall of the element gradually increasing up to the shoulder.

By this structure, it is possible to form a structural element which is electrically insulating but which can have considerable mechanical strength both in compression and as a beam. By making each element extend at least halfway into the next, in any plane normal to the axis of the assembly, there will be at least two thicknesses of the conical walls.

The cross-section of the member has a large second moment of area, and, by reason of the steps, is substantially uniform along the length of the assembly. With this construction there is in each of the elements an internal strengthening portion extending across the element. The assembled stack is thus strong in relation to its weight when loaded as a strut or as a beam compared with prior types of solid or substantially solid rods or hollow tubular elements. Moreover there are inherently a number of internal barriers to prevent internal electrical failure, as may occur for example if moisture gets into a hollow tubular element. The steps control the depth of insertion of one element into the next and hence provide control of the thickness of the adhesive.

The truncated conical elements are conveniently formed by moulding, using a resin-bonded glass-fibre material. A thermo-setting resin, such as an epoxy-resin may be employed.

Each element may be metal-reinforced to stiffen the structure. It is difficult to stiffen glass or porcelain elements using metal reinforcing since the metal reinforcing has to be flexible to accommodate differential thermal expansion. With the resin-bonded fibre elements, however, there is sufficient flexibility in the material to enable a metal stiffening member to be employed.

Each truncated conical element is completely closed across its narrower end. The closure portion may be of uniform thickness in the axial direction, and, to give maximum mechanical strength, this closure portion preferably lies in a flat plane normal to the axis of the element.

The truncated conical elements at their wider ends may have an outwardly extending flange to form a shed. Such a flange provides further structural strength.

By making the axial spacing of the elements in a stack at least three times and preferably at least six times the thickness of the closure portion, the stack of elements contains a series of voids at the inner ends of the successive elements. Preferably each element extends between a half and two-thirds of the way into the next element in a stack, the side and end wall thicknesses being such as to ensure that the voids constitute a substantial part of the hollow interior of an element.

To improve the electrical stress distribution, the voids may be filled with a suitable conducting material such as a foamed plastic made conductive by a suitable additive or a metal electrode may be embedded in or attached to each element.

At each end of a stack, suitable end members, possibly made of metal, may be provided shaped to mate with the end truncated conical element of the stack. These end members can be formed for attachment to other structural elements or for supporting conductors or insulators carrying conductors.

BRIEF DESCRIPTION OF THE DRAWING

The accompanying drawing is a diagrammatic longitudinal section through a compression structural member.

DESCRIPTION OF THE PREFERRED EMBODIMENT

Referring to the drawing, there is illustrated a structural member which can be used as a post insulator or as an electrically insulating compression component e.g. in a cross-arm of an overhead line tower or as a supporting beam for use with mobile equipment e.g. a crane jib, which might come in contact with overhead power lines. This member is formed of a stack of similar truncated conical elements 10. In the embodiment illustrated in the drawing, each element 10 is a truncated portion of a right circular cone with a wall of generally uniform thickness. At the narrower end, the element is completely closed by a flat portion 11, of uniform thickness, which lies normal to the axis of the element. The wall thickness and the cone angle are chosen so that, when the elements are stacked, each element enters about halfway into the next. The angle of the cone is acute and the wall thickness small compared with the axial length so that there is a substantial void inside each element, between that element and the next one in the stack, at the narrower end of the element. In the particular embodiment illustrated, the axial spacing of the elements, when they are nested, is more than four times the wall thickness. Each of the elements has a projecting flange 14 at the larger end to form a shed.

The depth of insertion of one element into the next is precisely controlled by providing steps on the inner and/or outer surfaces. In the construction shown, such steps are provided on both the inner and the outer surfaces as illustrated at 15 and 16 respectively. Each element, when inserted in another element abuts against a shoulder formed by a step 15 or 16.

If only the steps 15 are provided, the flat portion 11 of the next element will abut the step 15 when inserted. If only the outer steps 16 are provided, each step 16 abuts against the flange 14 of the next element. Preferably however steps on both surfaces are provided, as this gives a more uniform thickness to the assembly as a whole and hence a more uniform strength.

The elements are secured together with an adhesive coating the mating surfaces. The steps 15, 16, by controlling the depth of insertion, enable the thickness of the adhesive also to be precisely controlled. Control of the relative positions of the elements also controls the stresses on any internal fillings such as are described below.

The number of elements stacked together may be chosen to make an assembly of any required length. When loaded in compression, the stack of elements is rigid. The elements are secured together by an adhesive as previously mentioned to give tensile strength. Due to the depth of insertion, there is substantial strength against bonding stresses which is not dependent on the adhesive.

At the two ends, terminations 12, 13 are provided. These may be made of metal and may, for example, have holes for bolting onto other structural elements or for securing in position a conductor or a tension insulator for supporting a conductor. In the construction shown in the drawing, the termination 12 fits closely over the outer surface of one of the elements 10 at the narrower end thereof whilst the termination 13 fits closely within the inner surface of an element at the other end of the assembly.

In order to ensure a good electric stress distribution, the voids between the elements in the stack may be filled as shown at 17 with a conducting material such as a foamed plastic made conductive by a suitable additive before assembling. Alternatively or additionally, a metal electrode 18 may be embedded in the body or attached to the interior or exterior of the moulding; such an electrode has the advantage that it increases the rigidity of the element.

The elements 10 are conveniently formed by a moulding process using resin-bonded glass fibre material. Such material has a high strength. It is important with polymer insulating materials to make the creepage length large so as to minimize electrical damage to the surface and it is for this reason that sheds are used. Resin-bonded glass fibre insulators are vulnerable to damage caused by migration of water along the interfaces but the closed ends 11 of the elements in the multicomponent stack structures described above provide barriers against migration along inside walls and also limit the extent and effect of any migration within the material itself. The resin-bonded glass fibre material has a slight flexibility and hence it is possible to embed a rigid metal electrode in each element, the electrode forming a structure stiffening component which increases the rigidity and strength of the element.

We claim:

1. An electrically insulating structural member capable of withstanding bending movements which member is formed of a plurality of elements of resin-bonded fibre material, each element having a smooth truncated conical interior surface for mating with a corresponding smooth exterior surface of another element, each element being closed at its narrower end, the elements being stacked together and arranged so that the axial spacing of successive elements in the stack is at least three times the thickness, in the axial direction of the stack, of the closure portion extending across each element at its narrower end and each element extending at least halfway into the next element in the stack, each element having on at least one of its conical surfaces a step forming a shoulder facing in the direction towards the next element in the stack, the shoulder of the step on each element bearing against the end of the next element in the stack, and each step being formed by a thickening of the wall of the element gradually increasing up to the shoulder, the elements being secured together by an adhesive between the mating conical surfaces, and end terminations being provided, one at the top end of the stack fitting over and mating with the topmost element and secured to the outer conical surface thereof and the other fitting into and mating with the lowest element and being secured to the inner conical surface of the lowest element, the two end terminations having outwardly extending flanges for receiving fixing means for the member.

2. An electrically insulating structural member as claimed in claim 1 wherein the step on each element is formed on the outer surfaces and forms a shoulder facing towards the narrower end of the element, the shoulder of the step on each element bearing against the wider end of the next element in the stack.

3. An electrically insulating structural member as claimed in claim 1 wherein the step on each element is formed on the inner surface and forms a shoulder facing towards the wider end of the element, the shoulder of the step on each element bearing against the narrower end of the next element in the stack.

4. An electrically insulating structural member as claimed in claim 1 wherein each element has a step on its inner surface forming a shoulder facing towards the wider end of the element and a step on its outer surface forming a shoulder facing towards the narrower end of the element.

5. An electrically insulating structural member as claimed in claim 1 wherein each element is reinforced by a rigid metal element extending completely around the conical wall for the whole length of the element and through the closure portion at the narrow end of the element.

6. An electrically insulating structure as claimed in claim 1 wherein each element has, at its wider end, an outwardly extending flange.

7. An electrically insulating structural member as claimed in claim 1 wherein each element extends between half and two thirds of the way into the next element in the stack.

8. An electrically insulating structural member as claimed in claim 1 wherein the space in the stack between said closure portions of successive elements is filled with a foamed plastics material made conductive by an additive.

References Cited

UNITED STATES PATENTS

| | | | |
|---|---|---|---|
| 1,093,479 | 4/1914 | Sandford | 174—30 |
| 1,159,409 | 11/1915 | Muller | 174—210 X |
| 1,349,792 | 8/1920 | Stearns | 174—141 X |
| 3,317,659 | 5/1967 | Frey | 174—30 X |
| 3,325,584 | 6/1967 | Herzig | 174—140 X |
| 3,358,076 | 12/1967 | Rebosio | 174—209 X |

FOREIGN PATENTS

| | | |
|---|---|---|
| 326,650 | 2/1903 | France. |
| 1,513,125 | 1/1968 | France. |
| 363,351 | 11/1922 | Germany. |
| 462,174 | 3/1937 | Great Britain. |
| 885,193 | 12/1961 | Great Britain. |
| 914,552 | 1/1963 | Great Britain. |
| 1,113,247 | 5/1968 | Great Britain. |

OTHER REFERENCES

"EHV 'Nesting-Cone Insulators Announced," Electrical World, vol. 162, No. 12, Sept. 21, 1964, p. 138.

LARAMIE E. ASKIN, Primary Examiner

U.S. Cl. X.R.

174—150, 178, 209